US012644750B2

(12) United States Patent
Schmitt

(10) Patent No.: US 12,644,750 B2
(45) Date of Patent: Jun. 2, 2026

(54) DEVICE FOR INDICATING A FLUID LEVEL

(71) Applicant: HYDAC Accessories GmbH, Sulzbach (DE)

(72) Inventor: Martin Schmitt, Knopp-Labach (DE)

(73) Assignee: HYDAC ACCESSORIES GMBH, Sulzbach/Saar (DE)

( * ) Notice: Subject to any disclaimer, the term of this patent is extended or adjusted under 35 U.S.C. 154(b) by 322 days.

(21) Appl. No.: 18/566,731

(22) PCT Filed: May 4, 2022

(86) PCT No.: PCT/EP2022/061955
§ 371 (c)(1),
(2) Date: Dec. 4, 2023

(87) PCT Pub. No.: WO2022/258264
PCT Pub. Date: Dec. 15, 2022

(65) Prior Publication Data
US 2024/0263987 A1 Aug. 8, 2024

(30) Foreign Application Priority Data
Jun. 10, 2021 (DE) ..................... 10 2021 002 969.0

(51) Int. Cl.
*G01F 23/02* (2006.01)
(52) U.S. Cl.
CPC .................................... *G01F 23/02* (2013.01)
(58) Field of Classification Search
CPC ...................................................... G01F 23/02
USPC .. 73/323–326, 330, 328, 329, 327, 332–334
See application file for complete search history.

(56) References Cited

U.S. PATENT DOCUMENTS

| | | | | |
|---|---|---|---|---|
| 2,593,172 A | * | 4/1952 | Neumann | G01F 23/02 |
| | | | | 73/323 |
| 2,707,879 A | * | 5/1955 | Dwyer | G01L 7/00 |
| | | | | 73/713 |
| 4,693,117 A | * | 9/1987 | Mills | G01F 23/02 |
| | | | | 73/326 |
| 5,323,653 A | * | 6/1994 | Gruett | G01F 23/02 |
| | | | | 73/330 |

(Continued)

FOREIGN PATENT DOCUMENTS

| | | | | |
|---|---|---|---|---|
| DE | 856700 | 11/1952 | | |
| DE | 102011121529 A1 | * 6/2013 | ............. | G01F 23/74 |

(Continued)

OTHER PUBLICATIONS

Search Report for International Application No. PCT/EP2022/061955, 4 pages, Sep. 1, 2022.

*Primary Examiner* — John Fitzgerald
(74) *Attorney, Agent, or Firm* — Slayden Grubert Beard PLLC

(57) ABSTRACT

The invention relates to a device for indicating a fluid level in a storage tank, which device can be connected to the storage tank by means of two fluid connections vertically spaced apart from each other, the device consisting of three components which can be clipped to each other, in the form of: —a base part (12) for fastening to the storage tank: —a housing part (14) for indicating a fluid level (16) corresponding to the contents of the storage tank, the housing part being designed as a riser pipe; and —a closure part (18) for sealing off the interior (20) of the housing part (14) from the environment.

20 Claims, 3 Drawing Sheets

(56)  References Cited

U.S. PATENT DOCUMENTS

| | | | | | |
|---|---|---|---|---|---|
| 5,648,607 | A | * | 7/1997 | Wolf | ........................ G01F 23/02 |
| | | | | | 73/332 |
| 5,831,149 | A | * | 11/1998 | Webb | ........................ B67D 7/04 |
| | | | | | 73/49.1 |
| 11,378,437 | B2 | * | 7/2022 | Boldt | ........................ G01F 25/17 |
| 12,050,121 | B2 | * | 7/2024 | Käfer | ................. G01F 23/0046 |
| 2004/0083809 | A1 | * | 5/2004 | Wech | ........................ G01F 23/02 |
| | | | | | 73/323 |
| 2016/0377472 | A1 | * | 12/2016 | Wech | ........................ G01F 23/02 |
| | | | | | 73/326 |
| 2019/0195672 | A1 | * | 6/2019 | Boldt | ..................... F16J 15/004 |
| 2021/0239499 | A1 | | 8/2021 | Käfer | ........................ G01F 1/22 |

FOREIGN PATENT DOCUMENTS

| | | | | | |
|---|---|---|---|---|---|
| DE | 102015202953 | | 8/2016 | ............ | F16K 21/00 |
| GB | 1563781 A | | 4/1980 | ............ | G01F 23/02 |
| JP | 3134300 | | 8/2007 | ............ | G01F 23/02 |
| JP | 3134300 U | * | 8/2007 | | |
| WO | WO-2006111274 A1 | * | 10/2006 | ............ | G01F 23/02 |
| WO | 2019 214900 | | 11/2019 | ............ | G01F 23/02 |
| WO | WO-2019214900 A1 | * | 11/2019 | ............ | G01F 23/02 |

* cited by examiner

DEVICE FOR INDICATING A FLUID LEVEL

CROSS-REFERENCE TO RELATED APPLICATIONS

This application claims priority to German Patent Application No. DE 10 2021 002 969.0, filed on Jun. 10, 2021 with the German Patent and Trademark Office. The contents of the aforesaid patent application are incorporated herein for all purposes.

BACKGROUND

This background section is provided for the purpose of generally describing the context of the disclosure. Work of the presently named inventor (s), to the extent the work is described in this background section, as well as aspects of the description that may not otherwise qualify as prior art at the time of filing, are neither expressly nor impliedly admitted as prior art against the present disclosure.

The disclosure relates to a device for indicating a fluid level in a storage tank, which device can be connected to the storage tank by means of two fluid connections vertically spaced apart from each other.

Such devices are also known technically as fluid level indicators. DE 10 2018 003 727 A1 discloses a fluid level indicator for indicating and checking fluids, with two fluid connections vertically spaced apart from each other, which as fluid connections each open into a riser pipe that is surrounded by a frame, in the front wall of which there is a cut-out that reveals a viewing area for observing the fluid level in the riser pipe. In the known solution, an additional cover is provided which can be removably attached to the cut-out and forms a protective window protecting the riser pipe in the viewing area from mechanical effects from the outside. The riser pipe, which is routinely configured as a glass tube, is protected by the protective window from direct mechanical impact from the outside so that it cannot splinter or become scratched. The protective window is configured in one piece from a transparent, UV-resistant plastic material and has flexible hook parts to form a snap-in connection with the edge of the cut-out of the frame, so that the protective window can be easily attached to the frame by clipping and in this way can be replaced with a new protective window without significant effort in the event of possible damage.

SUMMARY

A need exists to improve the known solution to the effect that a fluid level indicator is obtained in a particularly cost-efficient manner. The need is addressed by the subject matter of the independent claim(s). Embodiments of the invention are described in the dependent claims, the following description, and the drawings.

DESCRIPTION

Figure 1:
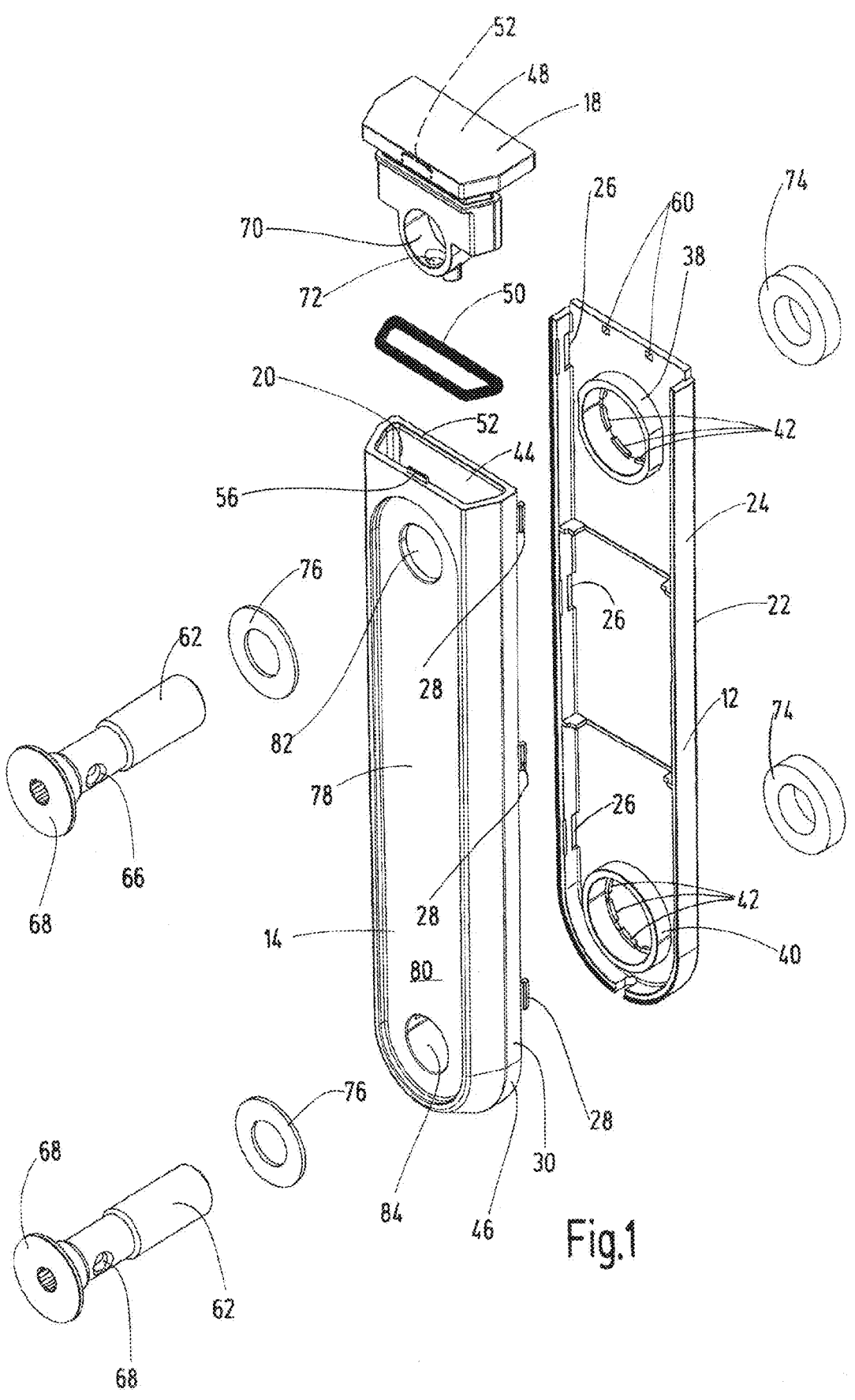
FIG. 1 shows main components of an example device in the manner of an exploded view.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, it is particularly beneficial that the device consists substantially of three mutually compatible components, in the form of:

a base part for fastening to the storage tank, a housing part configured in the manner of a riser pipe for indicating a fluid level corresponding to the contents of the storage tank, and a closure part for sealing off the interior of the housing part from the environment.

The individual components, which can be clipped together, form a kind of modular system with individual modules which are produced-to-stock in a rapid manufacturing sequence and, when evidently joined by clipping together, form a fluid level indicator. The individual components which can be clipped together may for example be obtained in the course of plastic injection moulding processes which results in favourable manufacturing costs and, with the same functional structure, a wide variety of different types of fluid level indicators can be obtained, particularly with regard to their respective overall size.

In some embodiments of the device according to the invention, it is provided that the base part has a rear wall extending flush at the rear which is at a distance from an assignable tank wall of the storage tank in the mounted state and which, protruding towards the housing part, has a retaining edge with locking means for clipping to further locking means of the housing part. In this way, if necessary, the at least partially transparent plastic housing part can be replaced with a new corresponding housing part in the event of mechanical damage, such as scratching or the like. Furthermore, the gap between the device and the tank counteracts a possible formation of condensation.

In some embodiments of the device, it is provided that the housing part is completely transparent for visual observation of the fluid level and has a cavity for receiving a fluid which determines the fluid level. In this way, the entire housing part is transparent to an observer, such that the fluid level accommodated in the housing part is visible through 180°.

In some embodiments of the device, it is provided that the closure part is formed of a plug which closes off the housing part towards one side, in particular the head end, whereas the housing part is closed on its side opposite thereto, in particular at the foot end, by wall parts of the housing part. While known solutions (DE 10 2018 003 727 A1) regularly have two plug-shaped closure parts on opposing sides of the tubular housing part as the actual display device, which is correspondingly costly in terms of production engineering, the solution according to the invention manages with only one such closure or end part which helps to make assembly easier. Furthermore, this also reduces the manufacturing costs, since only one closure part is thus required as opposed to the two closure parts otherwise usual.

In some embodiments of the device, it is provided that the respective fluid connection is formed of a hollow screw which passes through both the housing part as well as the base part and the tank wall of the storage tank in a fluid-conducting manner and is sealed by means of ring seals at least with respect to the tank wall and the housing part. It is for example provided in this case that the closure part has an annular recess through which the hollow screw passes, said hollow screw engaging in the storage tank above the fluid level therein. A further benefit here is that the rear wall of the base part is penetrated by recesses for the respective hollow screw which recesses, as annular receptacles, protrude towards the housing part.

In this way, conventional elastomer ring seals are used both to seal the fluid level indicator with respect to the tank wall and also with respect to the hollow screws which establish the respective fluid connection between the tank interior and the interior of the housing part as the actual indicator device. Like the hollow screws, the aforementioned ring seals are standardisable components which can be manufactured inexpensively in large quantities.

In some embodiments of the device, it is provided that the respective clip connection is formed of a locking hook, as the locking means of the one component, which engages, for example in a releasable manner, in an associated locking recess as the locking means of the other component to be clipped. The clip connections to this effect using locking hooks and associated, corresponding locking recesses can be obtained easily, for example as part of the plastic injection moulding production process, the snap-fitting being functionally reliable in use and it being possible nevertheless to release it again easily if necessary.

In some embodiments of the device, it is provided that the housing part has, on its free end face opposite the rear wall of the base part, an indentation on which the hollow screw rests with its head part via a ring seal, and that the respective hollow screw penetrates a further recess in the region of the indentation, which recess is aligned with the assignable recess in the base part. Due to the aligning recesses in the region of the housing part and the base part, these recesses are aligned with each other in such a manner that the respective hollow screw can pass through the aforementioned recesses without obstruction, for the purpose of fastening the entire device to the tank wall of the storage tank. In addition, the ring seals arranged therein are protected via the indentation.

In some embodiments of the device, it is provided that one of the further recesses in the housing part is configured in the manner of an elongated hole. Due to the embodiment of the elongated hole, it is possible to compensate the tolerance to the interface with the storage tank, with the option of compensating a hole spacing between ±1.5 mm with an angle compensation of ±3° to the hole axis. Within the tolerance range specified in this manner, it is then possible to readily compensate manufacturing tolerances relating to both the storage tank and the fluid level indicator, so that overall it is possible to get by with lower manufacturing accuracies than with solid fastening solutions such as those shown, for example, within the scope of DE 10 2015 202 953 A1 for a comparable level indicator device.

The solution according to the invention is explained in greater detail below with reference to an embodiment according to the drawing. The drawings show in principle and not to scale

BRIEF DESCRIPTION OF THE DRAWINGS

Detailed Description

Figure 4:
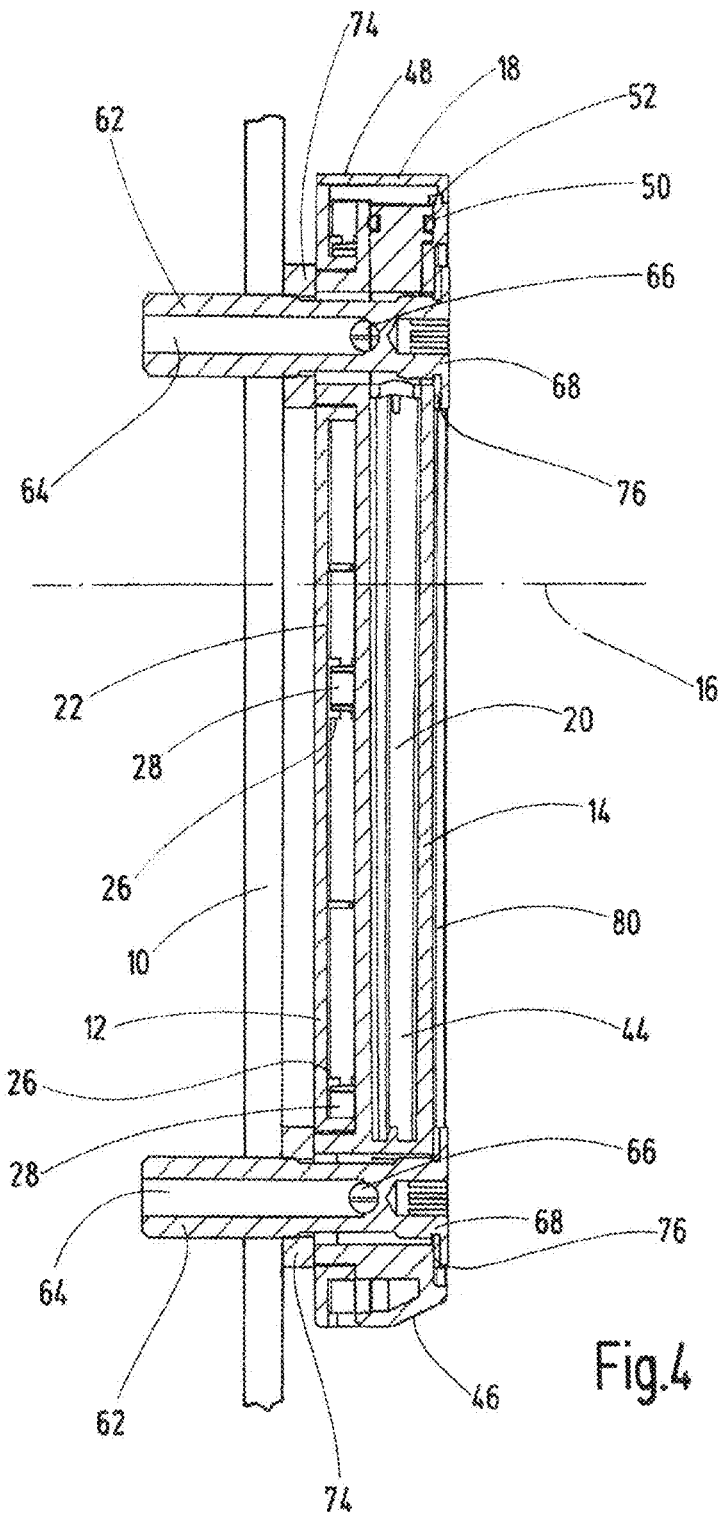
FIG. 4 a cross-section through an example device as it is attached to a storage tank, which storage tank with its tank wall is only shown in part.

The device for indicating a fluid level 16 in a storage tank, of which only a tank wall 10 is shown in part in FIG. 4, is shown in the manner of an exploded view in FIG. 1 and comprises, as its main components, of a plate-shaped base part 12 for fastening to the storage tank as well as a housing part 14 configured in the manner of a riser pipe for indicating a fluid level 16 corresponding to the contents of the storage tank, which level is reproduced in FIG. 4 in the form of a notional dashed line. Furthermore, a plug-like closure part 18 is present which is used to seal off the interior 20 of the housing part 14 from the environment.

The base part 12 has a rear wall 22 extending flush at the rear which, according to the diagram of FIG. 4, is at a distance from the assignable tank wall 10 of the storage tank in the mounted state. Furthermore, the rear wall 22 has, around the edge, a retaining edge 24 which is U-shaped and protrudes towards the housing part 14 and, viewed in the direction of FIG. 1, leaves an insertion space free at the top for the closure part 18. Arranged at the transition point between this retaining edge 24 and the base-side rear wall 22 are locking means in the form of locking recesses 26 which, in pairs opposite one another, form a means of engagement for further locking means in the form of locking hooks 28 on the housing part 14. Viewed in the longitudinal direction of the housing part 14, the aforementioned locking hooks 28 on the housing part 14 are also located opposite one another in pairs at the same level, so that a total of six locking hooks 28 on the housing part 14 can engage in a clipping manner in six locking recesses 26 in the housing part 14 for a releasable fastening operation. In this way, the hollow chamber-like housing part 14 can be clipped to the substantially plate-like base part 12, the partially circumferential retaining edge 24 overlapping a wall strip 30 on the housing part 14 with an accurate fit, so that in this respect the housing part 14 is enclosed at the edge by the base part 12 in this region.

Figure 2:
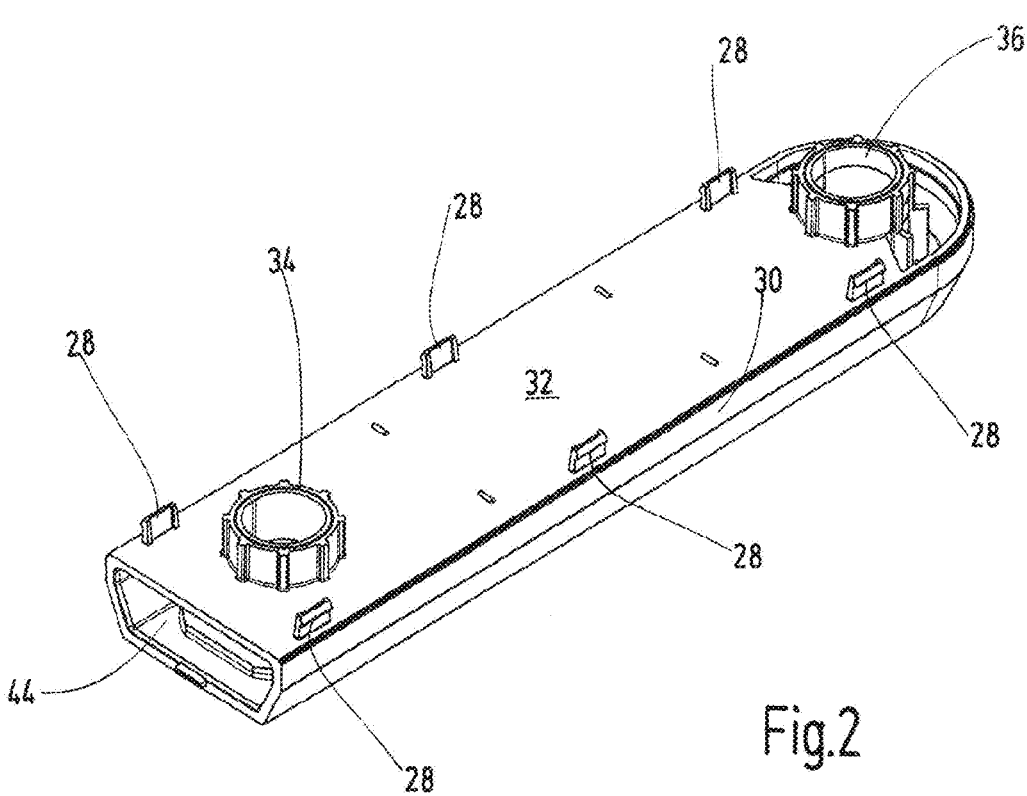
FIG. 2 a bottom view of an example housing part as the actual level indicator device.

As shown in particular in FIG. 2, the individual locking hooks 28 are formed of web-like protrusions which are oriented with their hook shape towards the wall strip 30 and otherwise protrude upwardly from the flat rear side 32 of the housing part 14. For improved engagement with the base part 12, two annular engagement bodies 34 and 36 are provided on the rear side 32 of the housing part 14, which engagement bodies engage, according to the diagram of FIG. 1, in two correspondingly configured annular recesses 38, 40 of the base part 12 in the mounted state. The annular recesses 38, 40 have on their inner side, at the point of the transition to the rear wall 22, individual limiters 42 which are separated from one another in a web-like manner and which limit the respective annular recess 38, 40 on the inner circumference and form an axial engagement means for the free end face of the two engagement bodies 34, 36.

The housing part 14 is transparent for visual observation of the fluid level 16 and has a hollow chamber or cavity 44 for receiving a fluid which determines the fluid level 16 and originates from the storage tank.

Figure 3:
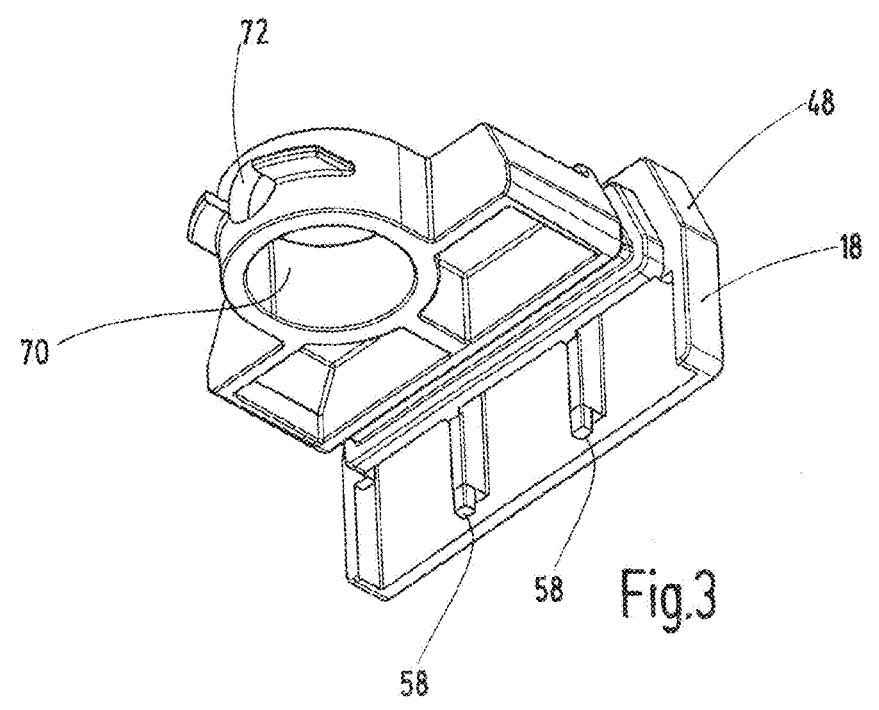
FIG. 3 a perspective bottom view of an example plug-like closure part.

As further emerges, in particular from FIGS. 1 and 3, the closure part 18 is formed of a plug which, viewed in the direction of FIG. 1, closes off the housing part 14 at the top towards its head end, whereas the housing part 14 is closed on its side opposite thereto, i.e. on its foot end, by wall parts 46 of the housing part 14. The closure part 18 has a head part 48 which comes into contact on its underside with an annular elastomer seal 50, which, while resting in an annular groove-like indentation 52 on the free end face of the housing part 14 when the closure part 18 is in place, seals off the cavity 44 in the interior 20 of the housing part 14 from the environment. Furthermore, the closure part 18 has, on the underside of its head part 48, a locking recess in the form of an engagement indentation 54 into which, as a further locking means, a locking hook 56 engages on the free end face of the housing part 14 in the locked or clipped state. In addition, according to the diagram of FIG. 3, the head part 48 has on its underside two locking bars 58 which extend parallel to each other and engage with assignable locking recesses 60 of square cross-section which, viewed in the direction of FIG. 1, are arranged through the upper end wall region of the rear wall 22 of the base part 12. The afore-mentioned locking means 54, 56, 58 and 60 can be used to securely lock the closure part 18 to the parts already connected to each other in the form of the base part 12 and the housing part 14.

As can further be seen from FIG. 1, the respective fluid connection is formed of a hollow screw 62 which passes through both the housing part 14 as well as the base part 12 and the tank wall 10 of the storage tank. In the longitudinal section shown in FIG. 4, the two hollow screws 62 engage with their free threaded portions in the storage tank after passing through the tank wall 10 and are fastened there to the tank wall 10 by means of so-called lock nuts, which are not shown for the sake of simplicity, and consequently the indicator device is fixed to the storage tank.

Each hollow screw 62 has a fluid duct 64 in the centre, which with its one free side opens into the interior of the storage tank and with its other side exits into at least one transverse drilled hole 66, which in turn exits into the cavity 44 of the housing part 14 and in this way establishes a fluid-conducting connection between the interior of the storage tank and the interior 20 of the housing part 14. It is understood that, viewed in the direction of FIGS. 1 and 4, the upper hollow screw 62 guides the tank air as fluid, and the lower hollow screw 62, on the other hand, introduces the liquid of the storage tank into the cavity 44 of the housing part 14, so that the fluid level 16 in the storage tank also arrives in the housing part 14 as the fluid level 16 to be indicated. It is further plausible that as the fluid level 16 in the storage tank changes, the fluid level 16 in the housing part 14 also changes accordingly, so that in this respect the fluid level indicator is functionally in use. The respective hollow screw 62 can be fixed via its screw head 68 with respect to the lock nuts in the storage tank, which are not shown in greater detail, by using a suitable engagement tool during a screwing-in movement. As emerges from FIGS. 1 and 3, the closure part 18 has an annular recess 70, formed integrally in the lower region, which is provided with an opening 72 at the base end for a fluid-conducting connection of the fluid channel 64 via the respective transverse drilled hole 66 of the upper hollow screw 62 to the opening 72, so that in this respect the air-conducting connection to the interior of the storage tank is established via the opening 72. The annular recess 70 in the closure part 18 is used for fixing in position and as a retainer for the upper hollow screw 62 to prevent loss. As further emerges from FIG. 1, pairs of ring seals 74, 76 are present, the ring seals 74 having an identical internal and external diameter and the ring seals 74 differing from the ring seal 76 only in that they are wider than the ring seals 76, which are configured as flat gaskets. Accordingly, the ring seals 74 are used to seal off the indicator device from the tank wall 10 with the hollow screws 62 passing through them, whereas the flat ring seals 76 in the region of the screw head 68 of each hollow screw 62 are used to seal off the indicator device from the environment. For securely fixing the hollow screws 62, it is additionally provided that the housing part 14 has, on its free end face 78 opposite the rear wall 22 of the base part 12, an indentation 80 on which the respective hollow screw 62 can rest with its screw head 68 via the ring seal 76. In this way, according to the diagram of FIG. 4, the screw head 68 with the associated ring seal 76 is received substantially flush in the indentation 80 of the housing part 14. For a compensation of tolerance for fastening the indicator device to the tank wall 10, the upper recess 82, viewed in the direction of FIG. 1, which merges into the annular engagement body 34, is designed as an elongated hole, so that the upper hollow screw 62 is guided longitudinally with clearance in the aforementioned upper recess 82, which also enables compensation of a drilling offset. In contrast, the lower recess 84 in the indentation 80, which merges into the further annular engagement body 36 in alignment, can also be designed as an elongated hole; however, this is not compulsory.

The indicator device according to the invention implements a modular system with the individual modules of base part 12, housing part 14, closure part 18, hollow screws 62 and ring seals 74, 76, which can be attached easily and non-interchangeably to fluid storage tanks of almost any design using the clip connections described.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A device for indicating a fluid level in a storage tank, which device is connectable to the storage tank using two fluid connections vertically spaced apart from each other, the device consisting essentially of three components which are configured to be clipped to one another in the form of:
   a base part for fastening to the storage tank;
   a housing part configured as a riser pipe for indicating a fluid level corresponding to the contents of the storage tank; and
   a closure part for sealing off the interior of the housing part from the environment; wherein
   a clip connection is formed of a locking hook of a first component of the three components, which engages in a locking recess of a second component of the three components.

2. The device of claim 1, wherein the housing part has a further recess, which further recesses is configured in the manner of an elongated hole.

3. The device of claim 1, wherein the closure part is formed of a plug which closes off the housing part towards one side, whereas the housing part is closed on its side opposite thereto by wall parts of the housing part.

4. The device of claim 3, wherein at least one of the two fluid connections is formed of a hollow screw which passes through both the housing part as well as the base part and the tank wall of the storage tank and is sealed by ring seals at least with respect to the tank wall and the housing part.

5. The device of claim 1, wherein the housing part is transparent for visual observation of the fluid level and comprises a cavity for receiving a fluid which determines the fluid level.

6. The device of claim 5, wherein the closure part is formed of a plug which closes off the housing part towards one side, whereas the housing part is closed on its side opposite thereto by wall parts of the housing part.

7. The device of claim 5, wherein at least one of the two fluid connections is formed of a hollow screw which passes through both the housing part as well as the base part and the tank wall of the storage tank and is sealed by ring seals at least with respect to the tank wall and the housing part.

8. The device of claim 1, wherein the base part has a rear wall extending flush at the rear which is at a distance from an assignable tank wall of the storage tank in the mounted state and which, protruding towards the housing part, has a retaining edge with the locking recess for clipping to the locking hook.

9. The device of claim 8, wherein the housing part is transparent for visual observation of the fluid level and comprises a cavity for receiving a fluid which determines the fluid level.

10. The device of claim 8, wherein the closure part is formed of a plug which closes off the housing part towards one side, whereas the housing part is closed on its side opposite thereto by wall parts of the housing part.

11. The device of claim 8, wherein at least one of the two fluid connections is formed of a hollow screw which passes through both the housing part as well as the base part and the tank wall of the storage tank and is sealed by ring seals at least with respect to the tank wall and the housing part.

12. The device of claim 1, wherein at least one of the two fluid connections is formed of a hollow screw which passes through both the housing part as well as the base part and the tank wall of the storage tank and is sealed by ring seals at least with respect to the tank wall and the housing part.

13. The device of claim 12, wherein the housing part has, on its free end face opposite the rear wall of the base part, an indentation on which the hollow screw rests with its screw head via a ring seal; and wherein the respective hollow screw penetrates a further recess in the region of the indentation, which recess is aligned with the assignable recess in the base part.

14. The device of claim 12, wherein the closure part has an annular recess through which the hollow screw passes, said hollow screw engaging in the storage tank above the fluid level therein.

15. The device of claim 14, wherein the rear wall of the base part is penetrated by recesses for the respective hollow screw which recesses, as annular receptacles, protrude towards the housing part.

16. The device of claim 14, wherein the housing part has, on its free end face opposite the rear wall of the base part, an indentation on which the hollow screw rests with its screw head via a ring seal; and wherein the respective hollow screw penetrates a further recess in the region of the indentation, which recess is aligned with the assignable recess in the base part.

17. The device of claim 12, wherein the rear wall of the base part is penetrated by recesses for the respective hollow screw which recesses, as annular receptacles, protrude towards the housing part.

18. The device of claim 17, wherein the housing part has, on its free end face opposite the rear wall of the base part, an indentation on which the hollow screw rests with its screw head via a ring seal; and wherein the respective hollow screw penetrates a further recess in the region of the indentation, which recess is aligned with the assignable recess in the base part.

19. A device for indicating a fluid level in a storage tank, which device is connectable to the storage tank using two fluid connections vertically spaced apart from each other, the device consisting essentially of three components which are configured to be clipped to one another in the form of:

a base part for fastening to the storage tank;

a housing part configured as riser pipe for indicating a fluid level corresponding to the contents of the storage tank; and a closure part for sealing off the interior of the housing part from the environment; wherein a clip connection is formed of a locking hook of a first component of the three components, which engages in a locking recess of a second component of the three components; and wherein the base part has a rear wall extending flush at the rear which is at a distance from an assignable tank wall of the storage tank in the mounted state and which, protruding towards the housing part, has a retaining edge with the locking recess for clipping to the locking hook.

20. A device for indicating a fluid level in a storage tank, which device is connectable to the storage tank using two fluid connections vertically spaced apart from each other, the device consisting essentially of three components which are configured to be clipped to one another in the form of:

a base part for fastening to the storage tank;

a housing part configured as a riser pipe for indicating a fluid level corresponding to the contents of the storage tank; and a closure part for sealing off the interior of the housing part from the environment; wherein a clip connection is formed of a locking hook of a first component of the three components, which engages in a locking recess of a second component of the three components; wherein at least one of the two fluid connections is formed of a hollow screw which passes through the housing part as well as the base part and is configured to pass a tank wall of the storage tank and is sealable by ring seals at least with respect to the housing part.

* * * * *